US009116278B2

(12) United States Patent
Kang et al.

(10) Patent No.: US 9,116,278 B2
(45) Date of Patent: Aug. 25, 2015

(54) LIGHT UNIT FOR DISPLAY AND LIQUID CRYSTAL DISPLAY INCLUDING THE SAME

(71) Applicant: Samsung Display Co., Ltd., Yongin, Gyeonggi-Do (KR)

(72) Inventors: Eui Jeong Kang, Suwon-si (KR); Hyun-Jeong Kim, Hwaseong-si (KR); Sang Heon Ye, Cheonan-si (KR); Sang Hoon Lee, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 79 days.

(21) Appl. No.: 14/091,595

(22) Filed: Nov. 27, 2013

(65) Prior Publication Data

US 2015/0029441 A1 Jan. 29, 2015

(30) Foreign Application Priority Data

Jul. 25, 2013 (KR) ........................ 10-2013-0088134

(51) Int. Cl.

*G02F 1/1335* (2006.01)
*F21V 7/04* (2006.01)
*F21V 8/00* (2006.01)

(52) U.S. Cl.

CPC ............ *G02B 6/0091* (2013.01); *G02B 6/0013* (2013.01)

(58) Field of Classification Search

CPC .................... G02F 1/133615; G02F 1/133603; G02F 1/133604; G02F 1/133608; G02F 2001/133607; G02B 6/0038; G02B 6/0053; G02B 6/0068

USPC ......................... 349/61, 62, 65; 362/612, 613

See application file for complete search history.

(56) References Cited

U.S. PATENT DOCUMENTS

| | | | | |
|---|---|---|---|---|
| 8,373,823 | B2 * | 2/2013 | Heo | 349/65 |
| 2013/0242226 | A1 * | 9/2013 | Jeong et al. | 349/58 |

FOREIGN PATENT DOCUMENTS

| | | | |
|---|---|---|---|
| JP | 2011-216322 | A | 10/2011 |
| KR | 1020090128693 | A | 12/2009 |
| KR | 1020100078296 | A | 7/2010 |
| KR | 1020110040365 | A | 4/2011 |
| KR | 1020110132152 | A | 12/2011 |
| KR | 1020130011855 | A | 1/2013 |

* cited by examiner

*Primary Examiner* — Mike Qi

(74) *Attorney, Agent, or Firm* — Cantor Colburn LLP

(57) ABSTRACT

A light unit for a display includes: a light guide plate, a plurality of light sources facing a side of the light guide plate and spaced apart from the light guide plate; and a buffering member between the light guide plate and the light source. The buffering member includes: spacing parts positioned respectively between adjacent light sources and contacting the light guide plate, and a blocking part connecting the plurality of spaced parts to each other and facing a side direction of each light source.

23 Claims, 11 Drawing Sheets

LIGHT UNIT FOR DISPLAY AND LIQUID CRYSTAL DISPLAY INCLUDING THE SAME

This application claims priority to Korean Patent Application No. 10-2013-0088134 filed on Jul. 25, 2013, and all the benefits accruing therefrom under 35 U.S.C. §119, the entire contents of which are incorporated herein by reference.

BACKGROUND (a) Field

The invention relates to a light unit for a display and a display including the light unit.

(b) Description of the Related Art

A computer monitor, a television, a mobile phone, and the like, which has been widely used today, requires a display. An example of the display may include a cathode ray tube ("CRT") display, a liquid crystal display ("LCD"), a plasma display, and the like. The LCD, which has received attention, has advantages, such as miniaturization, weight reduction and low power consumption, and therefore has been considered as an alternative device capable of overcoming drawbacks of the existing CRT and has been used in a large number of information processing devices which require a display.

Generally, the LCD is a device which includes a display panel including an upper substrate on which a common electrode, a color filter and the like, are disposed, and a lower substrate on which a thin film transistor, a pixel electrode and the like, are disposed. The display panel generates an electric field by applying different electric potentials to the pixel electrode and the common electrode in a state in which a liquid crystal material is between the upper and lower substrates, so as to change an arrangement of liquid crystal molecules in the liquid crystal material and control transmittance of light, thereby displaying an image.

The LCD does not emit light itself and therefore is a light receiving apparatus which requires a light source. The light source may be a separately mounted artificial light source or natural light. The artificial light source used in the LCD, may include a light emitting diode ("LED"), a cold cathode fluorescent lamp ("CCFL"), an external electrode fluorescent lamp ("EEFL") and the like.

The LCD using the artificial light source also includes a light guide plate ("LGP") which may allow light emitted from the light source to reach a whole of the display panel with uniform luminance.

The LGP is positioned to be adjacent to the light source and may be deformed due to heat transferred from the light source when the LCD is used over a relatively long period of time. Further, the LGP may apply a pressure to the light source due to the deformation thereof, and the light source may be damaged. Further, due to a light leakage phenomenon, a hot spot phenomenon and the like, from one side of the light source, may occur such that a light leakage may be seen on the display panel.

SUMMARY

One or more exemplary embodiment of the invention provides a light unit for a display, and a display including the same, capable of constantly maintaining an interval between a light guide plate and a light source of the display, while reducing a light leakage phenomenon.

An exemplary embodiment of the invention provides a light unit for a display, including: a light guide plate; a plurality of light sources facing a side of the light guide plate and spaced apart from the light guide plate; and a buffering member between the light guide plate and the plurality of light sources. The buffering member includes a plurality of spacing parts respectively between adjacent light sources among the plurality of light sources, and contacting the light guide plate, and a blocking part which connects the plurality of spacing parts to each other, and faces a side surface of each light source.

An opening defined in the buffering member faces the side of the light guide plate and exposes the plurality of light sources.

The blocking part overlaps the side surfaces of the light sources and a portion of the light guide plate, in a width direction of the blocking part, and a length direction of the blocking part may correspond to a length direction of the light guide plate.

A thickness of a spacing part is larger than a thickness of an adjacent light source, in a direction perpendicular to the side of the light guide plate.

The buffering member may further include a lower end surface which opposes the blocking part and connects the plurality of spacing parts to each other.

The buffering member may include at least one of silicon, polycarbonate and a rubber material.

The buffering member may further include titanium dioxide ($TiO_2$).

The buffering member may further include carbon.

A cross-sectional thickness of the blocking part of the buffering member, corresponding to a first area of the side surfaces of the light sources, is different from a cross-sectional thickness of the blocking part of the buffering member, corresponding to a second area of the side surfaces of the light sources.

The blocking part may include a cross-sectional arch shape repeated along a length of the buffering member.

Opposing ends of the blocking part, in a width direction of the buffering member, may be curved.

The light unit for a display may further include a circuit board on which the light source is mounted, and the circuit board may be parallel with the light guide plate.

Light emitted from the plurality of light sources may be incident to the side of the light guide plate.

The plurality of light sources may be disposed at a constant interval.

A plurality of openings spaced apart at the substantially constant interval is defined in the buffering member, faces the side of the light guide plate, and respectively exposes the plurality of light sources.

The light sources may include a light emitting diode.

The light unit for a display may further include a reflector beneath the light guide plate.

Another exemplary embodiment of the invention provides a liquid crystal display, including: a display panel; and a light unit. The light unit includes: a light guide plate; a plurality of light sources facing a side of the light guide plate and spaced apart from the light guide plate; and a buffering member between the light guide plate and the plurality of light sources. The buffering member includes a plurality of spacing parts respectively between adjacent light sources among the plurality of light sources, and contacting the light guide plate, and a blocking part which connects the plurality of spacing parts to each other, and faces a side surface of each light source.

According to one or more exemplary embodiment of the light unit for a display described above, it is possible to reduce or effectively prevent a light leakage phenomenon and provide the light unit for a display with improved reliability by constantly maintaining the interval between the light guide plate and the light source.

Further, it is possible to implement the side-view type light unit so as to reduce a width of a bezel region of a liquid crystal display as the display.

In addition, it is possible to provide the liquid crystal display having excellent performance at a low cost by using the buffering member having the simple structure.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
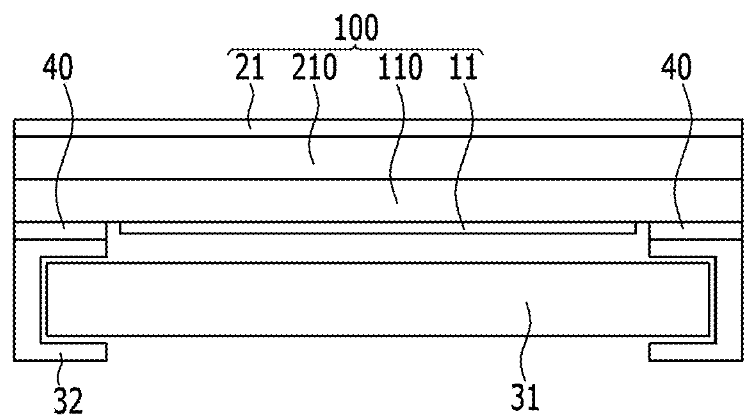
FIG. 1 is a cross-sectional view illustrating an exemplary embodiment of a liquid crystal display including a light unit for a display according to the invention.

The invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the invention.

In the drawings, the thickness of layers, films, panels, regions, etc., are exaggerated for clarity. Like reference numerals designate like elements throughout the specification. As used herein, the term "and/or" includes any and all combinations of one or more of the associated listed items.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

Hereinafter, a light unit for a display according to the invention will be described in detail with reference to FIGS. 1 to 6.

Figure 2:
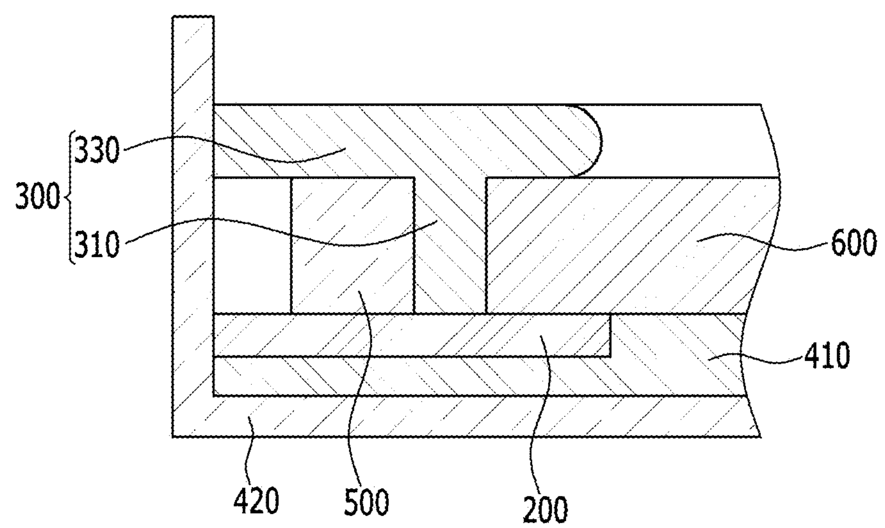
FIG. 2 is a partial cross-sectional view of an exemplary embodiment of a light unit for a display according to the invention.
Figure 3:
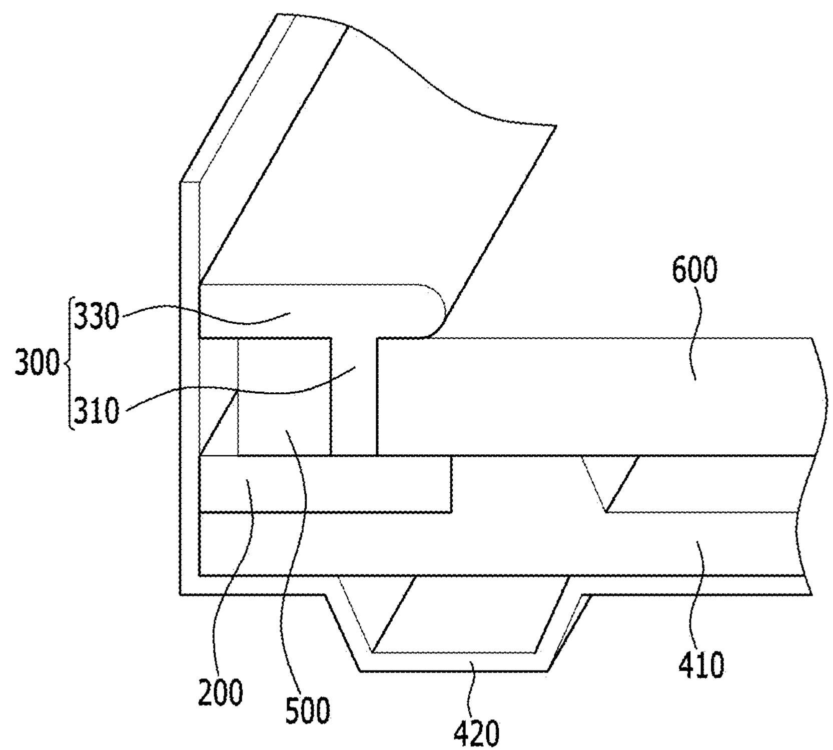
FIG. 3 is a partial perspective view of the light unit for a display in FIG. 2 according to the invention.
Figure 4A:
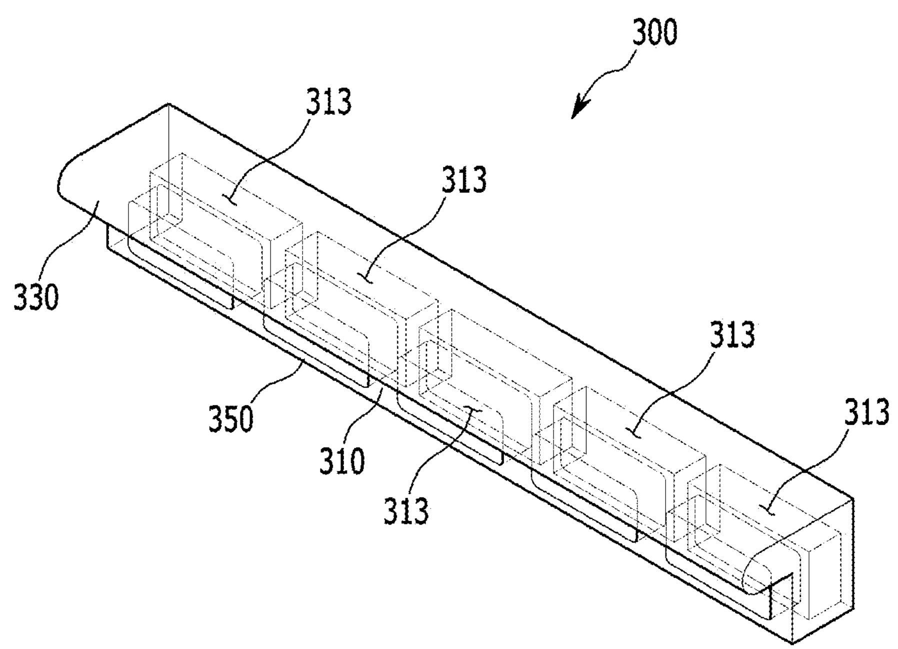
FIGS. 4A and 4B are a perspective view and a front view, respectively, of an exemplary embodiment of a flat buffering member according to the invention.
Figure 4B:
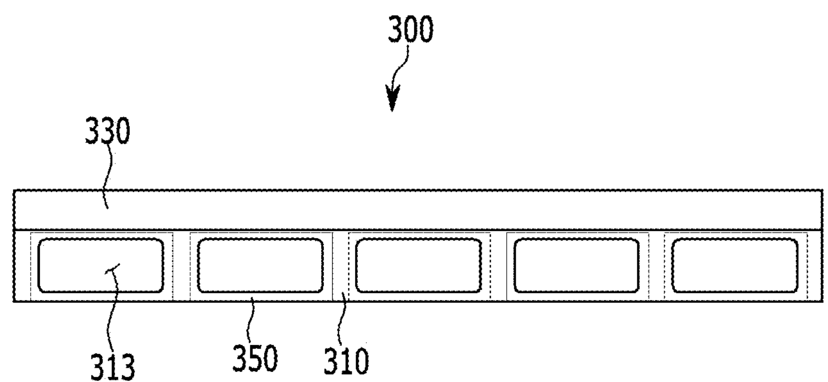
Figure 5A:
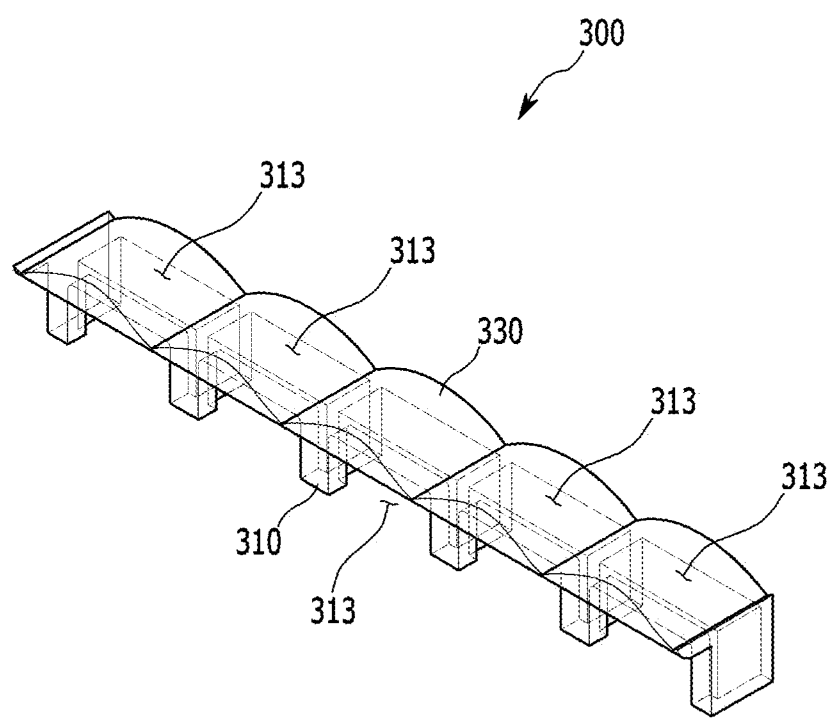
FIGS. 5A and 5B are a perspective view and a front view, respectively, of an exemplary embodiment of an arch-shaped buffering member according to the invention.
Figure 5B:
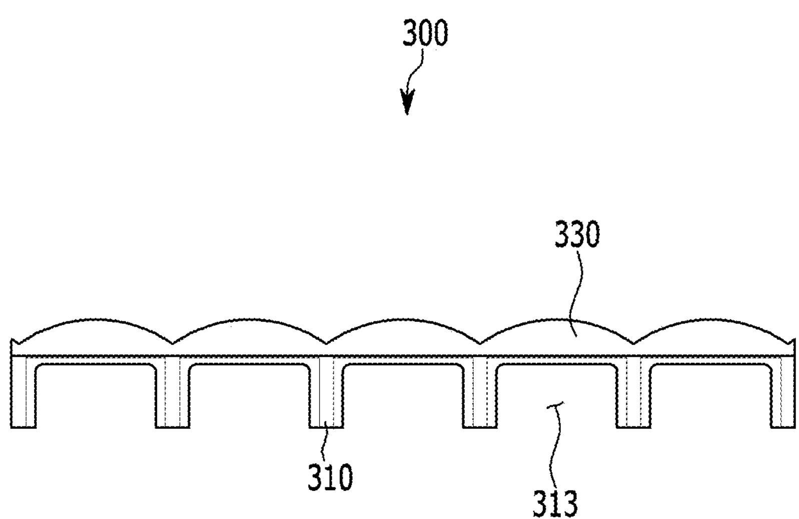
Figure 6:
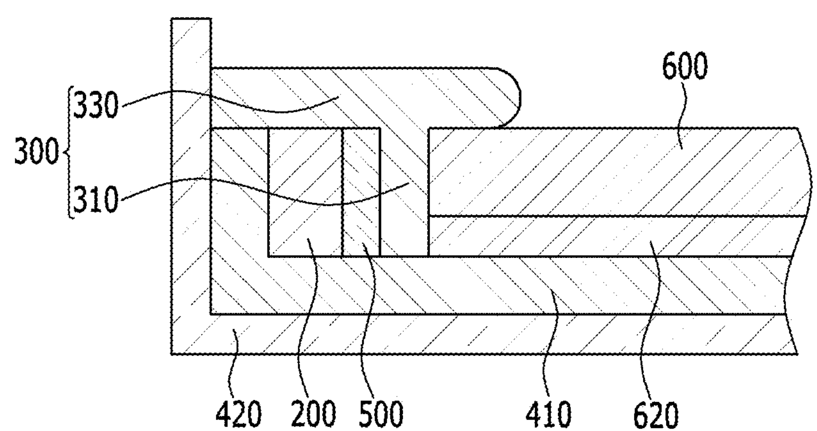
FIG. 6 is a cross-sectional view of an exemplary embodiment of a top-view type light unit for a display according to the invention.

FIG. 1 is a cross-sectional view illustrating an exemplary embodiment of a liquid crystal display including a light unit for a display according to the invention, FIG. 2 is a partial cross-sectional view of an exemplary embodiment of a light unit for a display according to the invention, FIG. 3 is a partial perspective view of the light unit for a display according to the invention, FIGS. 4A and 4B are a perspective view and a front view, respectively, of an exemplary embodiment of a flat buffering member according to the invention, FIGS. 5A and 5B are a perspective view and a front view, respectively, of an exemplary embodiment of an arch-shaped buffering member according to the invention, and FIG. 6 is a cross-sectional view of an exemplary embodiment of a top-view type light unit for a display according to the invention.

First, the liquid crystal display according to the invention, which is illustrated in FIG. 1, includes a light unit 31 which generates and supplies light, and a liquid crystal display panel 100 which receives the light to display an image.

First, the display panel 100 has a core role in the liquid crystal display to display an image. The display panel 100 includes first and second substrates 110 and 210 bonded to each other and facing each other. A liquid crystal layer including liquid crystal molecules is disposed between the first and second substrates 110 and 210.

Although not clearly illustrated in the drawings under the premise of an active matrix type display, the first substrate 110 is otherwise referred to a lower substrate or an array substrate, and includes pixels defined therein, a plurality of gate lines intersecting a plurality of data lines, and each intersecting point is provided with thin film transistors ("TFTs"), respectively which are connected such as in one-to-one correspondence to transparent pixel electrodes disposed in each pixel.

Further, the second substrate 210 is otherwise referred to as an upper substrate or a color filter substrate, and includes color filters of, for example, red ("R"), green ("G") and/or blue ("B") colors, which respectively correspond to each pixel, and a black matrix surrounding each of the color filters and covering non-display elements such as a gate line, a data line and a thin film transistor.

Further, the first substrate 110 or the second substrate 210 may be provided with a transparent common electrode which corresponds to the pixel electrode. Outer surfaces of the first and second substrates 110 and 210 include first and second polarizers 11 and 21 thereon, which selectively transmit only specific light, respectively.

The liquid crystal display apparatus may further include a gate driving circuit, a printed circuit board and a data driving circuit. Therefore, in the display panel 100 having the above-mentioned structure, when the TFTs selected for each gate line are turned on by a turn on or off signal of the gate driving circuit transferred through the printed circuit board, a signal voltage of the data driving circuit is transferred to a corresponding pixel electrode through a data line, such that an arrangement direction of the liquid crystal molecules is changed by an electric field formed between the pixel electrode and the common electrode, thereby showing a difference in light transmittance.

A back surface (e.g., opposite to the viewing side) of the display panel 100 is provided with the light unit 31 generating and supplying light so as to show the difference in light transmittance as an image.

As such, in the illustrated exemplary embodiment of the liquid crystal display according to the invention, a chassis part is not positioned between the display panel 100 and the light unit 31, and the display panel 100 and the light unit 31 contact each other.

In the illustrated exemplary embodiment of the liquid crystal display according to the invention, the light unit 31 is fixed to a mold frame 32. The mold frame 32 including the light unit 31 fixed thereto, is bonded to the display panel 100 by a fixing member such as an adhesive part 40. The display panel 100 is bonded to the light unit 31 via the mold frame 32 and the adhesive part 40, without using a separate fixing component such a top chassis at four edges of the liquid crystal display. That is, the display panel 100 may be considered bonded to the light unit 31 solely by the mold frame 32 and the adhesive part 40.

A bezel portion of the liquid crystal display may be considered a portion thereof outside of a viewing or display area defined by the liquid crystal display panel 100, in a plan view of the liquid crystal display. When a separate fixing component such a top chassis at four edges of the liquid crystal display is employed, the bezel portion and an overall thickness of the liquid crystal display may be increased. However, in one or more exemplary embodiment of a liquid crystal display according to the invention, since the display panel 100 is bonded to the light unit 31 via the mold frame 32 and the adhesive part 40, without using the separate fixing component, an overall thickness and weight of the liquid crystal display is decreased and a width of the bezel portion is reduced.

In exemplary embodiments, a side-view type circuit board to be described below and a light source may also effectively reduce the width of the bezel, as compared a liquid crystal display including the circuit board positioned in parallel with a light guide plate.

The light unit 31 illustrated in FIG. 2 generates and supplies light to the display panel 100 and the display panel 100 positioned on the light unit 31 controls the light supplied by the light unit 31 to represent a grayscale, and thus an image is displayed by the display panel 100.

As illustrated in FIGS. 2 and 3, an exemplary embodiment of the light unit 31 according to the invention includes a light guide plate 600, a light source 500 positioned on one side of the light guide plate 600, a circuit board 200 on which the light source 500 is mounted, and a buffering member 300 disposed between the light plate guide plate 600 and the circuit board 200.

The light guide plate 600 is configured to uniformly transfer light emitted from the light source 500 to the display panel 100. The light guide plate 600 may include a material including an acrylic, and may be an injection-molded product. However, the invention is not limited thereto. The liquid crystal display may be configured by disposing the display panel 100 on (e.g., above) the light unit 31. That is, the display panel 100 may be disposed on the light guide plate 600, and the light guide plate 600 uniformly emits light incident to a side thereof through substantially an entirety of an upper surface thereof to allow the light to be uniformly transferred to the display panel 100. The upper surface of the light guide plate 600 may be otherwise referred to as a light emitting surface, a surface opposite to the light emitting surface may be referred to as an opposing or rear surface, and side surfaces connect the light emitting and opposing surfaces to each other. A side surface facing the light source 500 may be otherwise referred to as light incident surface of the light guide plate 600.

The light source 500 is positioned facing a side of the light guide plate 600 and is disposed spaced apart from the light guide plate 600. The light source 500 is configured to direct a main emitting direction of light to the side of the light guide plate 600, such that the light emitted from the light source 500 may be incident to the side of the light guide plate 600. That is, as illustrated in FIG. 3, the light source 500 is disposed to face a side of the light guide plate 600 which connects the light emitting and opposing surfaces to each other.

While the light source 500 is disposed facing a side of the light guide plate 600 as described above, the invention is not limited thereto, and the light source 500 may also be disposed on more than one side of the light guide plate 600, such as disposed on opposing sides of the light guide plate 600 which face each other. Where the light source 500 is disposed on the opposing side of the light guide plate 600, the light emitted from the light source 500 is incident to both of the opposing sides of the light guide plate 600. Further, the light guide plate 600 may have four sides, and the light source 500 may also be disposed facing all four sides.

The light source 500 may include a point light source, for example, a light emitting diode ("LED") and the like. The light source 500 may be provided in plural in the light unit 31, and the plurality of light sources 500 may be disposed separated from each other at a constant interval along a light incident surface. However, the invention is not limited thereto, and the plurality of light sources 500 may also be disposed spaced apart from each other at an irregular interval.

The light unit is divided into a top-view type and a side-view type depending on a direction of the light emitted from the LED. The top-view type light unit is a type in which light is directed to a front surface (e.g. distal surface with respect to the circuit board) of the LED and the side-view type light unit 31 is a type in which light is directed to a side of the LED (e.g., not the distal surface). The type of light unit is also related to a position of the circuit board 200 to be described below.

The above-mentioned LED is configured of a group of R, G and B light emitting elements to implement white light. However, the invention is not limited thereto.

Further, in FIG. 2, a lower chassis 420 includes a bottom portion (e.g., horizontal member in FIG. 2) and a sidewall portion (e.g., vertical member in FIG. 2) which form a receiving space of the lower chassis 420. A space (no reference numeral) is defined between the light source 500 and the lower chassis 420 and may remain an empty space in which no other element of the liquid crystal display is disposed. As an exemplary embodiment, the buffering member 300 to be described below may be positioned in the space defined between the light source 500 and the lower chassis 420 so as to define a non-empty space. However, even when the space defined between the light source 500 and the lower chassis 420 is an empty space, as illustrated in FIG. 2, the buffering member 300 reduces or effectively prevents light leakage from an upper portion of the light unit 31, such that there is minimal light leakage due to the space.

The circuit board 200 may be a printed circuit board ("PCB"). The PCB may be formed (e.g., provided) by removing an unnecessary copper coil from a base board formed by covering a plate, which is an insulator, with a thin copper foil, depending on a circuit diagram, and providing electronic circuits on the base board. The light source 500 is mounted on the circuit board 200 and a plurality of light sources 500 is connected to each other by a wiring (not shown). All the light sources 500 may be integrally connected to each other by the wiring and/or may be respectively connected to each other by being divided into a plurality of light source groups. In one exemplary embodiment, for example, a group of three light sources 500 may be connected to each other by the wiring, so that a same signal may be applied to each of the three light sources 500 in the group. The light source 500 may be applied with a signal through the wiring, which may drive the light source 500.

The top-view type light unit 31 includes a circuit board 200 which faces a light incident surface of the light guide plate 600 (see FIG. 6), such that light is emitted from the light source 500 through a distal surface thereof. The side-view type light unit 31 includes a circuit board 200 which is parallel with the light guide plate 600, such that light is emitted from the light source 500 through a side surface (e.g., not the distal surface) thereof. A distal surface may be that surface of the light source 500 opposing the circuit board 200.

In the side-view type light emitting diode as illustrated in FIGS. 2 and 3, the circuit board 200 is disposed substantially parallel with the light guide plate 600 to more effectively reduce a width of the bezel region. While FIGS. 2 and 3 illustrate, for example, the side-view type light unit, the invention is not limited thereto.

In the illustrated exemplary embodiments, the side-view type light unit 31 according to the invention emits light in a direction parallel with a width direction of the circuit board 200 which apples a driving signal to the light source 500. The width direction is taken perpendicular to the light incident surface of the light guide plate 600.

Further, in the side-view type light unit 31, the LED 500 is seated on the circuit board 200 to emit light toward a light incident surface of the light guide plate 600. The circuit board 200 may include a metal circuit board or a flexible circuit board.

The buffering member 300 includes a spacing part 310 and a blocking part 330, and is positioned in a space between the light guide plate 600 and the light source 500. The buffering member 300 reduced or effectively prevents damage to the light source 500 due to deformation of the light guide plate 600 and reduces or effectively prevents a light leakage phenomenon, a hot spot phenomenon and the like, from light emitted from the light source 500. The spacing part 310 and the blocking part 330 may form a single, unitary, indivisible buffering member, but the invention is not limited thereto.

The spacing part 310 maintains a distance between the light guide plate 600 and the light source 500, and serves as a stopper to the light guide plate 600. To this end, the spacing part 310 extends from a light incident surface of the light guide plate 600 to a point which meets an end or surface of the light source 500 which faces the light incident surface of the light guide plate 600. That is, a thickness of the spacing part 310 is equal to or larger than a sum of a thickness of the light source 500 and a distance between the light guide plate 600 and the light source 500, where the thicknesses and the distance are taken perpendicular or normal to the light incident surface of the light guide plate 600.

In more detail, the thickness of the spacing part 310 of the buffering member 300 is larger than the thickness of the light source 500. That is, the spacing part 310 of the buffering member 300 is located further toward the light incident surface of the light guide plate 600 than the light source 500, and thus may contact the light incident surface of the light guide plate 600.

By the structure above, the spacing part 310 of the buffering member 300 may contact the light guide plate 600, but the light source 500 does not contact the light guide plate 600. The light guide plate 600 may be deformed by heat from the light source 500 applied to the light guide plate 600, and the spacing part 310 of the buffering member 300 may be deformed by the deformation of the light guide plate 600. As the light guide plate 600 is deformed to extend towards the light source 500, the buffering member 300 may be compressed by a pressure applied to the buffering member 300 from the extending light guide plate 600. Therefore, the thickness of the buffering member 300 is reduced by the pressure.

The thickness of the light source 500 is be smaller than a lowest thickness when the spacing part 310 of the deformed buffering member 300 is compressed, such that the light incident surface of the light guide plate 600 may not contact the light source 500 even though the light guide plate 600 is deformed. That is, the buffering member 300 is sufficiently thick in a direction normal to the light incident surface of the light guide plate 600, such that the light source 500 may not be affected by the deformation in the light guide plate 600.

According to the one or more exemplary embodiment of the invention, the light unit 31 is provided with the buffering member 300, such that damage to the light source 500 due to the deformation in the light guide plate 600 is reduced or effectively prevented. Therefore, the distance between the light source 500 and the light guide plate 600 may be minimized, and thus a light loss rate may also be reduced. When the spacing part of the buffering member is not provided, in order to prevent damage to the light source 500 due to the deformation in the light guide plate, a space between the light source 500 and the light guide plate 600 is defined, such that the light loss rate at the space between the light source 500 and the light guide plate 600 may be increased. In contrast, in one or more exemplary embodiment of the light unit 31 according to the invention, a space between the light source 500 and the light guide plate 600 to accommodate a deforming light guide plate is omitted, such that the light source 500 and the light guide plate 600 may be disposed to be sufficiently close to each other, thereby increasing efficiency of incident light.

In one or more exemplary embodiment of the light unit 31 according to the invention, when the light guide plate 600 is deformed to be extended, the light guide plate 600 contacts the buffering member 300. The light guide plate 600 applies a pressure to the buffering member 300, such that the light guide plate 600 and the buffering member 300 contact each other. Even though the light guide plate 600 applies a pressure to and contacts the buffering member 300, the deformed light guide plate 600 does not contact the light source 500, such that the light source 500 is not damaged.

That is, in one or more exemplary embodiment of the light unit 31 according to the invention, the light source 500 is not affected by the deformation in the light guide plate 600.

Further, according to exemplary embodiments of the invention, since the plurality of light sources 500 is provided, as illustrated in FIGS. 5A, 5B, and 6, the spacing part 310 is disposed between adjacent light sources 500. When the plurality of light sources 500 are spaced apart by a constant interval, a plurality of spacing parts is also spaced apart by a constant interval. The illustrated exemplary embodiments of the invention illustrate the plurality of light sources 500 having a constant interval therebetween, but the invention not limited thereto. When the plurality of light sources 500 has an irregular interval therebetween, the plurality of spacing parts also has an irregular interval therebetweeen.

As illustrated in FIGS. 4A, 4B, 5A and 5B, the blocking part 330 connects the plurality of spacing parts 310 and is elongated to be positioned at one side of the light source 500. The one side of the light source 500 is a direction vertical to the display panel 100 at which occurs the light leakage phenomenon due to the light source 500.

A width of the blocking part 330 covers one side of the light source 500, an interval between the light source 500 and the light guide plate 600, and a portion of the light guide plate 600, so as to block light emitted from the one side of the light source 500.

Further, the blocking part 300 is elongated parallel to a length direction of the light guide plate 600, and reduces or effectively prevents the light leakage phenomenon over the length direction of the display panel 100. That is, a length of the blocking part 330 substantially corresponds to a length of the light guide plate 600, and the blocking part 330 is positioned overlapping the space between the light guide plate 600 and the light source 500.

Further, the blocking part 330 may have a long rectangular pillar shape (flat type) having a substantially uniform cross-sectional thickness as illustrated in FIGS. 4A and 4B, but the invention is not limited thereto. In one exemplary embodiment, for example, a stronger light is emitted from a central portion of a side of the light source 500 facing the blocking member 330 than from opposing ends of the side of the light source 500 facing the blocking member 330. Therefore, it may be difficult for the blocking part 330 having the uniform thickness to block the light emitted from the central portion of the side of the light source 500.

In an alternative exemplary embodiment, the cross-sectional thickness of the blocking part 330 may be different corresponding to a quantity of light emitted from a side of the light source 500, which faces the blocking part 330. Therefore, a thickness of the blocking part 330 may be slightly larger at the central portion of the side of the light source 500 which emits a stronger light, and may be slightly smaller at opposing ends of the side of the light source 500 which emits a slightly weaker light. The blocking part 330 having a cross-sectional thickness, which corresponds to the plurality of light sources 500, may have a repeated arch shape in a length direction of the buffering member 300, as illustrated in FIG. 5B. However, the blocking part 300 according to the invention is not limited to an arch shape and may have any of a number of shapes providing different thicknesses corresponding to the light quantity of the corresponding light source 500.

Further, referring to FIGS. 4A and 4B, one or both opposing ends of the blocking part 330 in the width direction may have a curved shape. Alternatively, both opposing ends of the blocking part 330 in the width direction may have a plate (e.g., planar) shape, as illustrated in FIGS. 5A and 5B. The curved shape forms a smooth slope with respect to peripheral members of the light unit 31.

Further, the cross-sectional thickness of the blocking part 330 is not limited. When the blocking part includes a considerable amount of shielding material (not shown), the blocking part 330 may nevertheless be relatively thin. In other exemplary embodiments, the blocking part 330 may be relatively thick. That is, an amount of shielding material is inversely proportional to the cross-sectional thickness of the blocking part 330.

Further, opposing ends of the blocking part 330 in the width direction may have a curved shape as well as a straightly inclined shape, for forming a smooth slope with respect to the peripheral members.

As illustrated in FIGS. 5A and 5B, an opening 313 defined by portions of the buffering member 300 faces the light incident surface of the light guide plate 600, and the light source 500 overlapped by the blocking part 330 is exposed through the opening. That is, the opening is positioned to promote a propagation of light in the direction of the light guide plate 600 without hindering the emission of light from the light source 500.

The shape of the opening is not limited, but may substantially correspond to the shape of the light source 500, so as not to hinder the emission of light from the light source 500.

When the light source 500 is configured in plural, the opening 313 may be configured in plural. Further, when the plurality of light sources 500 is disposed at a constant interval, the plurality of openings 313 may be disposed at a constant interval to respectively expose the plurality of light sources 500.

One light source 500 may be disposed within one opening 313. However, the invention is not limited thereto, and more than one among the plurality of light sources 500 may be disposed within one continuous opening 313.

A lower end 350 illustrated in FIGS. 4A and 4B connects the plurality of spacing parts 310, and is opposite to the blocking part 330. When the blocking part 330 connects the plurality of spaced parts 310 at an upper end of the buffering member 300, the lower end 350 connects the plurality of spacing parts 310 at a lower end of the buffering member 300.

The lower end 350 maintains a relatively rigid and constant structure in a length direction of the buffering member 300. The light source 500 is fixedly inserted between the opening 313 through the lower end 350 stably connecting the spacing parts 310 to each other.

A material of the buffering member 300 may include at least one of silicon, polycarbonate and a rubber material. In particular, where the buffering member 300 includes the silicon, the silicon may have a transparency of about 90%.

That is, the buffering member 300 may include a soft material, such as a silicon material, and the like but the invention is not limited thereto. The buffering member 300 may be compressed due to the deformation of the light guide plate 600 and may return to an original state when pressure from or deformation of the light guide plate 600 is removed. When the light guide plate 600 is extended due to the consistently applied heat from the light source 500, the buffering member 300 may be compressed by a pressure applied from the light guide plate 600 to the buffering member 300. Further, when the light guide plate 600 is itself returned to an original state thereof, the buffering member 300 may also return to an original state thereof. The buffering member 300 may include a material which may reduce or remove the pressure applied to thereto and promote return of the buffering member 300 to the original state thereof.

Further, the material of the buffering member 300 may further include titanium dioxide ($TiO_2$). The titanium dioxide has a shielding and diffusion property and may be added to the corresponding liquid crystal display to shield and/or diffuse light. An amount of the titanium dioxide may be, for example, about 0% to about 10 wt % with respect to a total weight of the buffering member 300, and may be about 5 wt %.

Further, the material of the buffering member 300 may further include carbon. The carbon also has a shielding property. When the carbon is added, the buffering member 300 may have a dark gray color to shield light. The carbon may be added to the corresponding liquid crystal display to have an appropriate color depending on the light leakage degree. An amount of the carbon may be, for example, about 0% to about 5 wt % with respect to a total weight of the buffering member 300.

As described above, when materials other than the soft materials such as silicon are included in the buffering member 300, the soft materials may be included in an amount which when added to the other materials make a total of 100%. In one exemplary embodiment, for example, when the buffering member includes 5 wt % of the titanium dioxide and 5 wt % of the carbon, the buffering member 300 includes 90 wt % of the soft materials such as silicon.

In addition, the buffering member 300 may include a reflective material. In one exemplary embodiment, for example, the buffering member 300 may include a white silicon material. Some of the light emitted from the light source 500 may not be incident to the light guide plate 600. Light which is not incident to the light guide plate 600 may be reflected by the buffering member 300 which includes the reflective material to be incident to the light guide plate 600. That is, when the buffering member 300 includes the reflective material, a quantity of light incident to the light guide plate 600 may be increased.

Further, in one or more exemplary embodiment of the light unit 31 according to the invention, the buffering member 300 may include the reflective material, such that the light emitted from the light source 500 with a predetermined angle is reflected back to the buffering member 300 and is ultimately incident to the light guide plate 600, thereby further increasing the efficiency of incident light.

When, in an original state, the buffering member 300 is disposed so that there is no space between the buffering member 300 and the light guide plate 600 and between the buffering member 300 and the light source 500, lifting of the buffering member 300 from the light unit 31 may be reduced or effectively prevented.

Further, referring again to FIG. 6, another exemplary embodiment of a light unit 31 according to the invention may further include a reflector 620 which is positioned beneath the light guide plate 600.

The reflector 620 changes a light path to a direction toward the display panel 100 so as to reduce or effectively prevent leaking of the light emitted from the light source 500 to outside the light unit 31. That is, when the light emitted from the light source 500 is emitted through a lower surface of the light guide plate 600, the reflector 620 reflects the light and enables the reflected light to be incident into the light guide plate 600 again.

Further, referring again to FIGS. 2 and 3, the light unit 31 may be fixed to an auxiliary chassis 410. The lower chassis 420 may surround the auxiliary chassis 410. The above-mentioned mold frame 32 (see FIG. 1) may collectively include the auxiliary chassis 410 and the lower chassis 420.

Referring again to FIG. 6, the auxiliary chassis 410 may include a bottom surface, and sides connected to the bottom surface. The circuit board 200 of the light unit 31 may be fixed to a side of the auxiliary chassis 410. The circuit board 200 may be fixed to the auxiliary chassis 410 by a fixing member (not shown) such as an adhesive member, a screw member or the like.

The lower chassis 420 may be disposed to enclose both the auxiliary chassis 410 and the light unit 31, and serve to protect the light unit 31.

Figure 7:
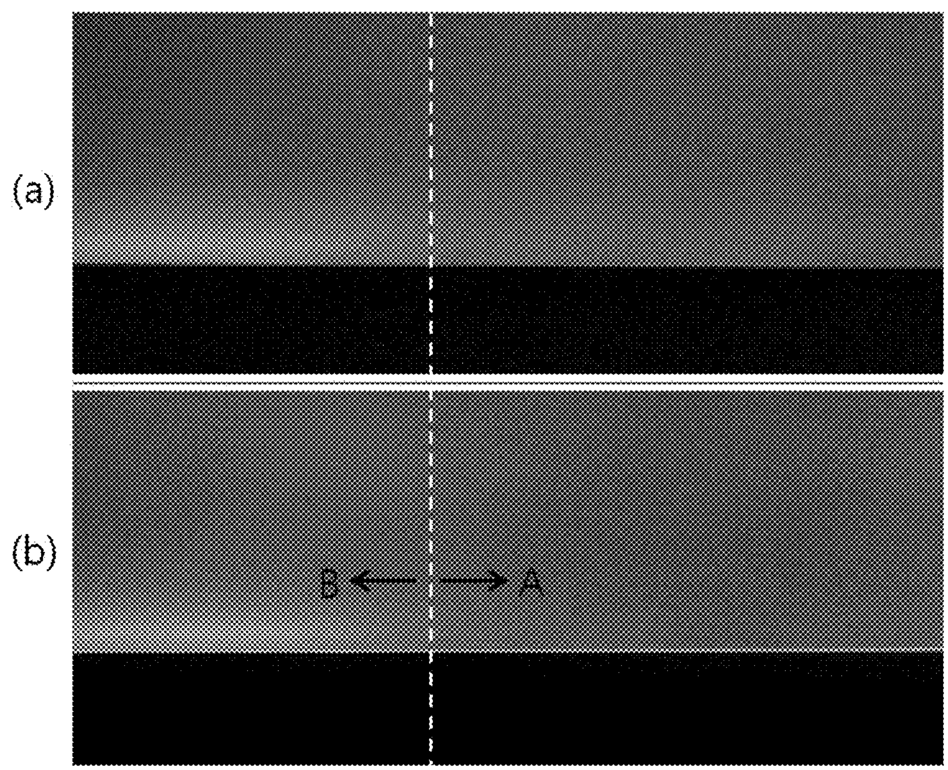
FIG. 7(*a*) and FIG. 7(*b*) are photographs respectively illustrating light viewable on display panels with and without the buffering member according to the invention.
Figure 8:
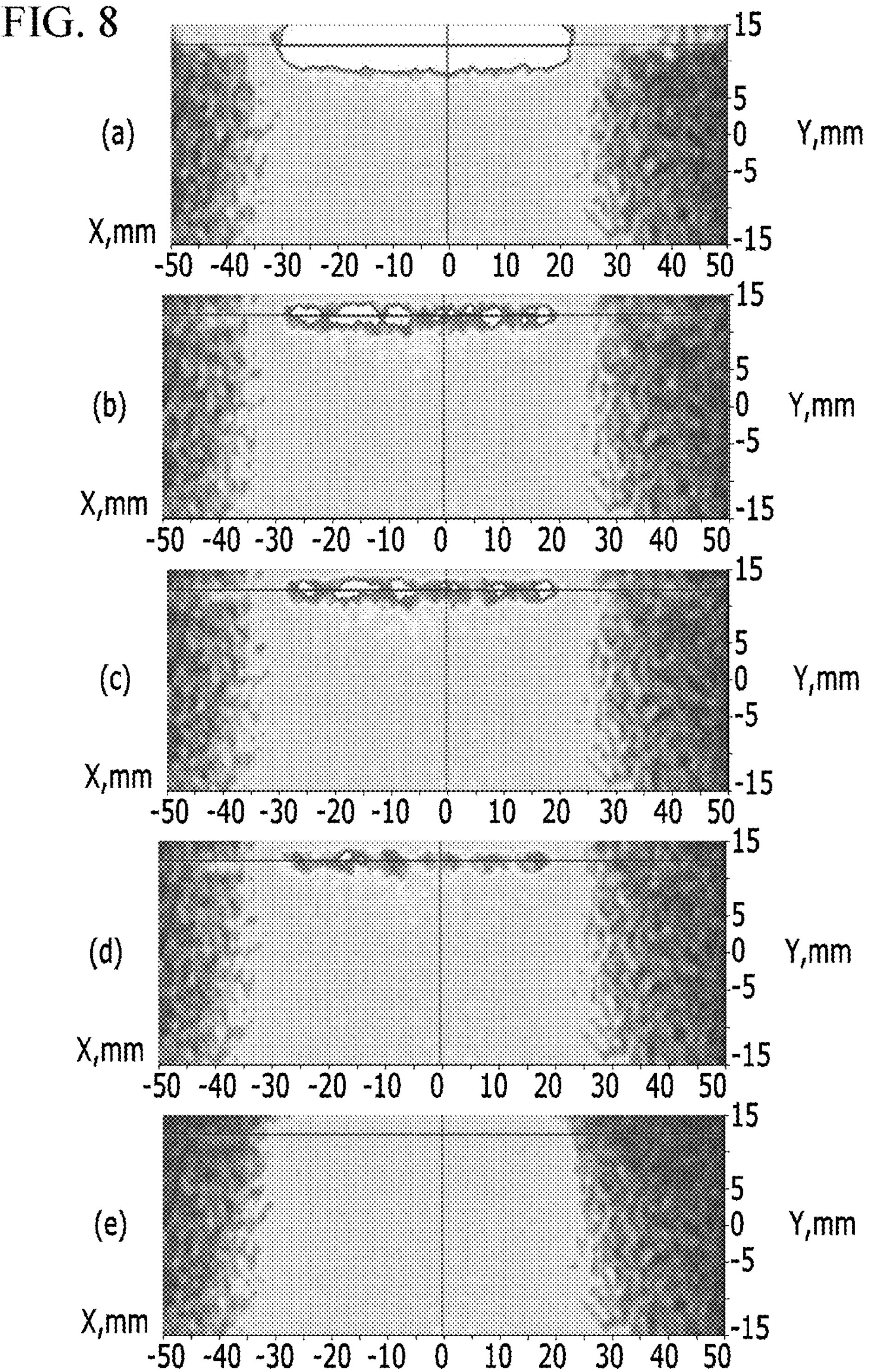
FIG. 8(*a*) to FIG. 8(*e*) are optical simulation photographs of a light leakage phenomenon observed for displays with various configurations.
Figure 9:
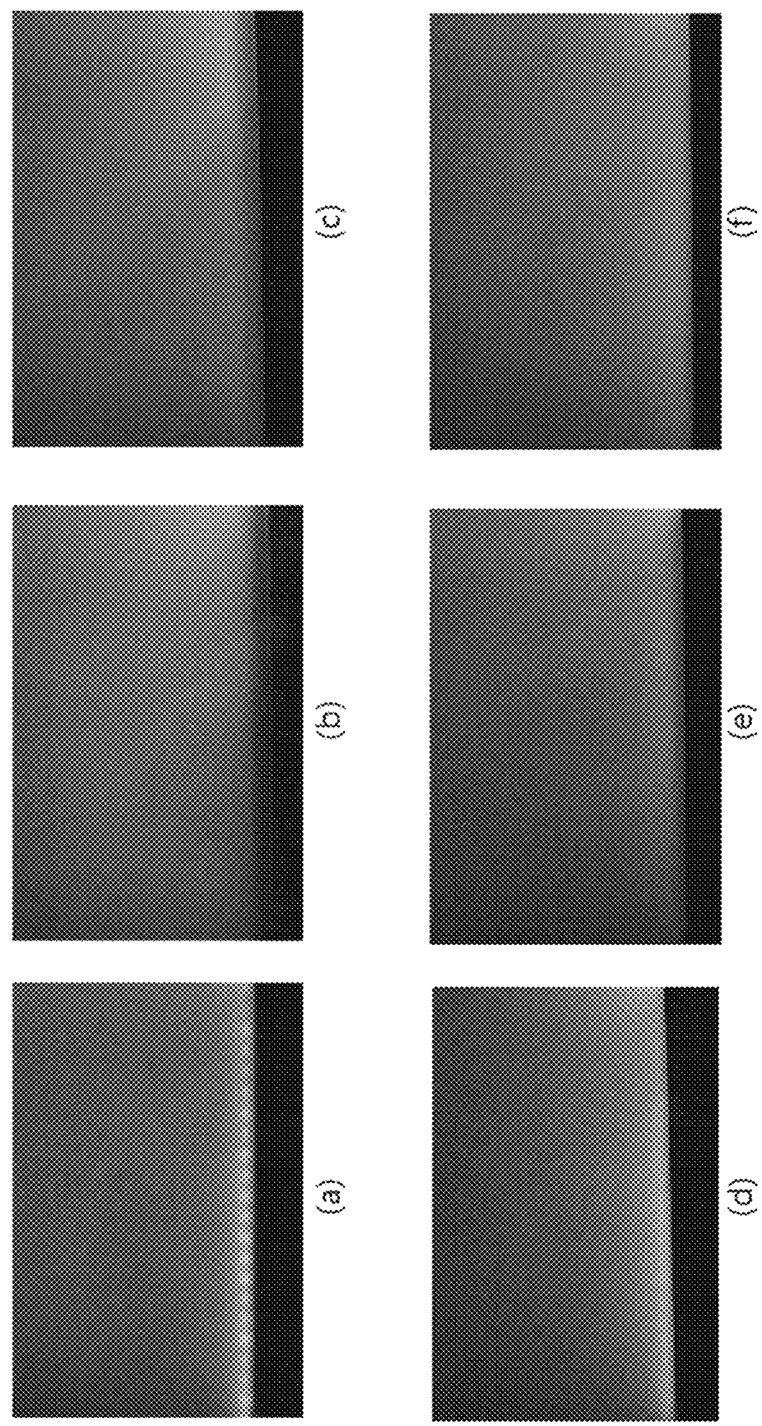
FIG. 9(*a*) to FIG. 9(*f*) are photographs of views of liquid crystal displays with various configurations.

Hereinafter, an experiment of the light leakage phenomenon, which is performed with respect to an exemplary embodiment of a liquid crystal display including a buffering member according to the invention, will be described with reference to FIGS. 7 to 9. FIGS. 7(*a*) and 7(*b*) are diagrams respectively illustrating light viewable on display panels with and without the buffering member according to the invention, FIG. 8(*a*) to FIG. 8(*e*) are photographs of a light leakage phenomenon according to an exemplary embodiment of a display of the, and FIG. 9(*a*) to FIG. 9(*f*) are photographs of exemplary embodiments of a liquid crystal display according to the invention.

Referring to FIGS. 7*a* and 7*b*, it may be appreciated that based on a dotted line, there is little light leakage phenomenon in region A, but the light leakage phenomenon may be considerable in region B. The reason is that an exemplary embodiment of a buffering member according to the invention is applied to region A and the buffering member is not applied to region B.

Referring to FIGS. 8*a* to 8*e*, FIG. 8*a* illustrates a display to which a buffering member is not applied. As a Comparative Example, FIG. 8*b* illustrates an Example in which the flat type buffering member (FIGS. 4A and 4B) is applied, FIG. 8*c* is an Example in which the arch-shaped buffering member (FIGS. 5A and 5B) is applied, FIG. 8*d* illustrates an Example in which reflectance is increased in the arch-shaped buffering member, and FIG. 8E illustrates an Example in which absorbance is increased in the arch-shaped buffering member.

Referring to FIG. 8*a*, it may be confirmed that a considerable amount of light is leaked between the light guide plate and the light source. In contrast, in FIGS. 8*b* and 8*c* illustrating that the flat type or arch-shaped buffering member is used, the light leakage phenomenon is slightly reduced. In particular, it is confirmed that the light leakage phenomenon minimally occurs when the reflectance or absorbance is increased while using the arch-shaped buffering member.

Referring to FIGS. 9*a* to 9*f*, FIG. 9*a* illustrates a display to which a buffering member is not applied. As a Comparative Example, FIG. 9*b* illustrates a display to which the flat buffering member including 90 wt % of silicon having a transparency of 90%, 5 wt % of titanium dioxide and 5 wt % of carbon is applied, FIG. 9*c* illustrates a display to which the flat buffering member including 90 wt % of silicon having a transparency of 90% and 10 wt % of titanium dioxide is applied, FIG. 9*d* illustrates a display to which the flat buffering member including 95 wt % of silicon having a transparency of 95% and 5 wt % of titanium dioxide is applied, FIG. 9*e* illustrates a display to which the arch-shaped buffering member including 90 wt % of silicon having a transparency of 90% and 10 wt % of titanium dioxide is applied, and FIG. 9*f* illustrates a display to which the arch-shaped buffering member including 95 wt % of silicon having a transparency of 95% and 5 wt % of titanium dioxide is applied.

Referring to FIG. 9*a*, it may be confirmed that considerable light leakage phenomenon is present in the display to which the buffering member is not applied as the Comparative Example to exemplary embodiments of the invention.

In contrast, it may be appreciated that the light leakage phenomenon is largely reduced in the display (FIGS. 9*b* to 9*f*) to which an exemplary embodiment of a buffering member according to the invention is applied. Therefore, where an exemplary embodiment of a buffering member according to the invention is used, the light source may be protected from the deformation in the light guide plate and the light leakage phenomenon may be largely reduced.

One or more exemplary embodiment of the liquid crystal display according to the invention includes the light unit including the buffering member as described above, and includes the display panel for displaying an image. While above-described exemplary embodiments of the invention refer to the light unit used in the liquid crystal display as an example, the invention is not limited thereto, and may be applied to any display including a light unit.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A light unit for a display, comprising:
a light guide plate;
a plurality of light sources facing a side of the light guide plate and spaced apart from the light guide plate; and
a buffering member between the light guide plate and the plurality of light sources, and comprising:
a plurality of spacing parts respectively between adjacent light sources among the plurality of light sources, and contacting the light guide plate, and
a blocking part which connects the plurality of spacing parts to each other, and faces a side surface of each light source.

2. The light unit for a display of claim 1, wherein:
an opening defined in the buffering member faces the side of the light guide plate and exposes the plurality of light sources.

3. The light unit for a display of claim 2, wherein:
the blocking part overlaps the side surfaces of the light sources and a portion of the light guide plate, in a width direction of the blocking part, and
a length direction of the blocking part corresponds to a length direction of the light guide plate.

4. The light unit for a display of claim 3, wherein:
the buffering member further comprises a lower end surface which opposes the blocking part and connects the plurality of spacing parts to each other.

5. The light unit for a display of claim 1, wherein:
a thickness of a spacing part is larger than a thickness of an adjacent light source, in a direction perpendicular to the side of the light guide plate.

6. The light unit for a display of claim 1, wherein:
the buffering member comprises at least one of silicon, polycarbonate and a rubber material.

7. The light unit for a display of claim 6, wherein:
the buffering member further comprises titanium dioxide.

8. The light unit for a display of claim 7, wherein:
the buffering member further comprises carbon.

9. The light unit for a display of claim 1, wherein:
a cross-sectional thickness of the blocking part of the buffering member, corresponding to a first area of the side surfaces of the light sources, is different from a cross-sectional thickness of the blocking part of the buffering member, corresponding to a second area of the side surfaces of the light sources.

10. The light unit for a display of claim 9, wherein:
the blocking part comprises a cross-sectional arch shape repeated along a length of the buffering member.

11. The light unit for a display of claim 10, wherein:
opposing ends of the blocking part, in a width direction of the buffering member, are curved.

12. The light unit for a display of claim 1, further comprising:
a circuit board on which the plurality of light sources is disposed,
wherein the circuit board is substantially parallel with the light guide plate.

13. The light unit for a display of claim 1, wherein:
light emitted from the plurality of light sources is incident to the side of the light guide plate.

14. The light unit for a display of claim 1, wherein:
the plurality of light sources is spaced apart at a substantially constant interval.

15. The light unit for a display of claim 14, wherein:
a plurality of openings spaced apart at the substantially constant interval is defined in the buffering member, faces the side of the light guide plate, and respectively exposes the plurality of light sources.

16. The light unit for a display of claim 1, wherein:
the plurality of light sources comprises a light emitting diode.

17. The light unit for a display of claim 1, further comprising:

a reflector beneath the light guide plate.

18. A liquid crystal display, comprising:

a display panel; and a light unit, comprising:

a light guide plate;

a plurality of light sources facing a side of the light guide plate and spaced apart from the light guide plate; and a buffering member between the light guide plate and the plurality of light sources, and comprising:

a plurality of spacing parts respectively between adjacent light sources among the plurality of light sources, and contacting the light guide plate, and a blocking part which connects the plurality of spacing parts to each other, and faces a side surface of each light source.

19. The liquid crystal display of claim 18, wherein:

an opening defined in the buffering member faces the side of the light guide plate and exposes the plurality of light sources.

20. The light crystal display of claim 18, wherein:

the blocking part overlaps the side surfaces of the light sources and a portion of the light guide plate, in a width direction of the blocking part, and a length direction of the blocking part corresponds to a length direction of the light guide plate.

21. The liquid crystal display of claim 18, wherein:

the buffering member comprises at least one of silicon, polycarbonate and a rubber material.

22. The liquid crystal display of claim 21, wherein:

the buffering member further comprises at least one of titanium dioxide and carbon.

23. The liquid crystal display of claim 18, wherein:

a cross-sectional thickness of the blocking part of the buffering member, corresponding to a first area of the side surfaces of the light sources, is different from a cross-sectional thickness of the blocking part of the buffering member, corresponding to a second area of the side surfaces of the light sources.

* * * * *